S. KAYE.
MACHINE FOR ERECTING WALLS OF BRICK AND THE LIKE.
APPLICATION FILED DEC. 14, 1918.
1,411,172. Patented Mar. 28, 1922.
12 SHEETS—SHEET 2.
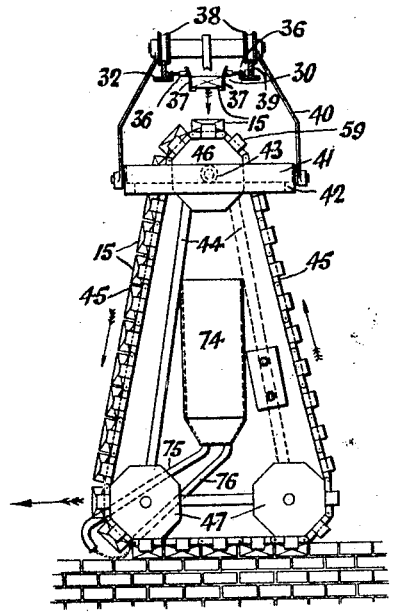
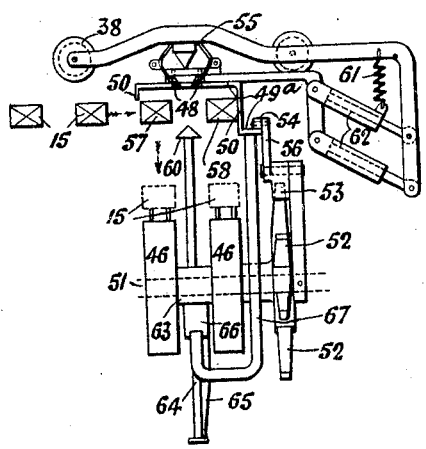
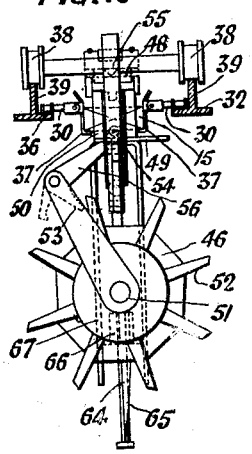
Inventor:
Stewart Kaye.
by his Attorneys

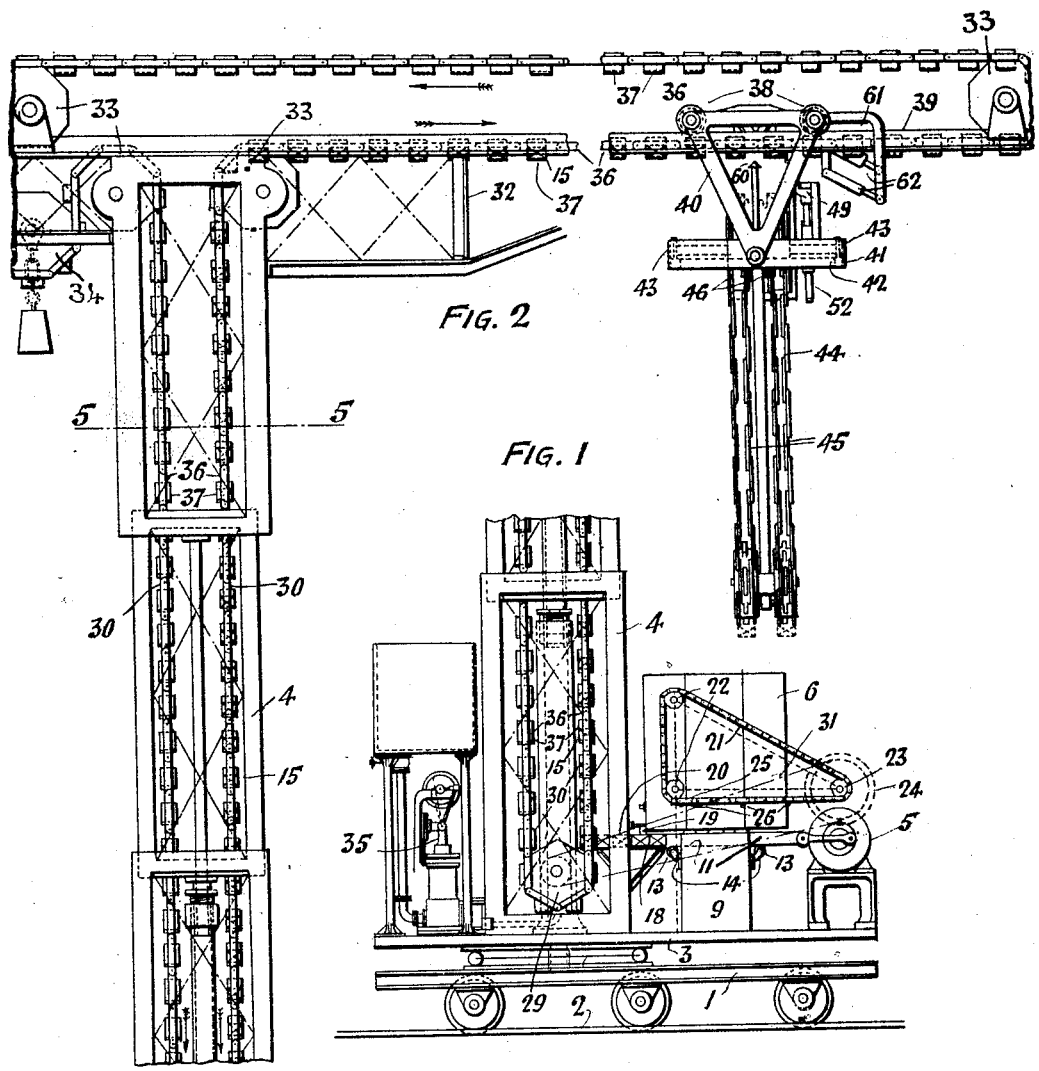

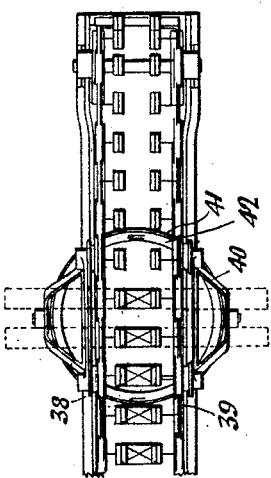
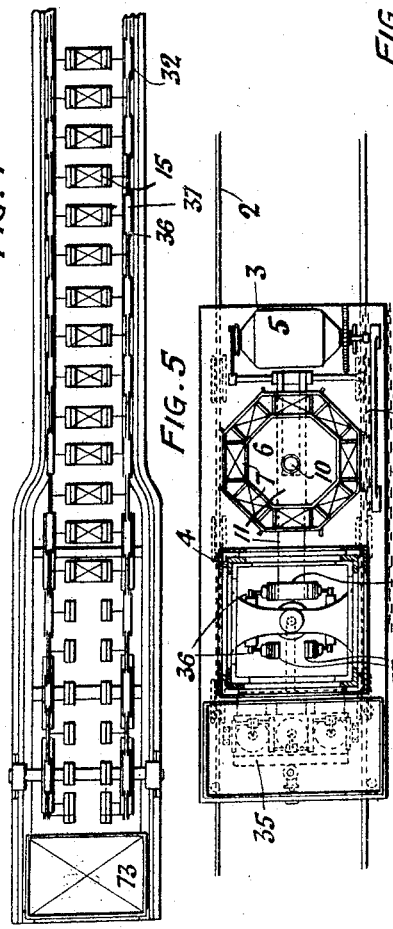
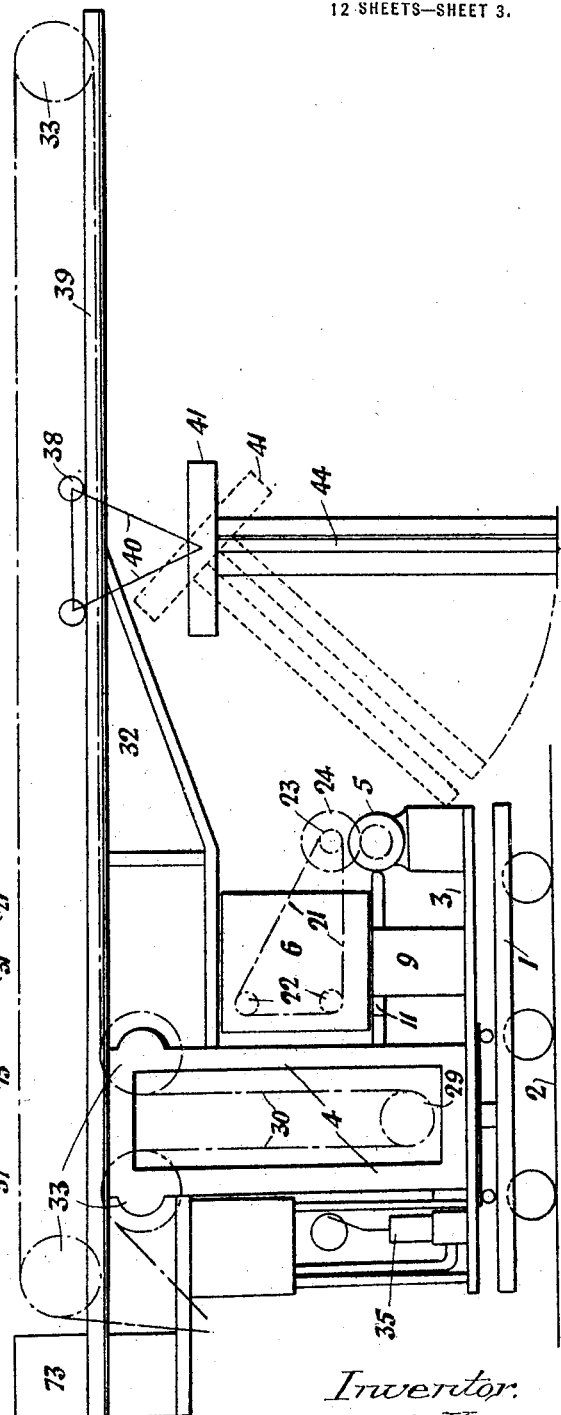

S. KAYE.
MACHINE FOR ERECTING WALLS OF BRICK AND THE LIKE.
APPLICATION FILED DEC. 14, 1918.

1,411,172.

Patented Mar. 28, 1922.

Inventor.
Stewart Kaye.
By his Attorneys

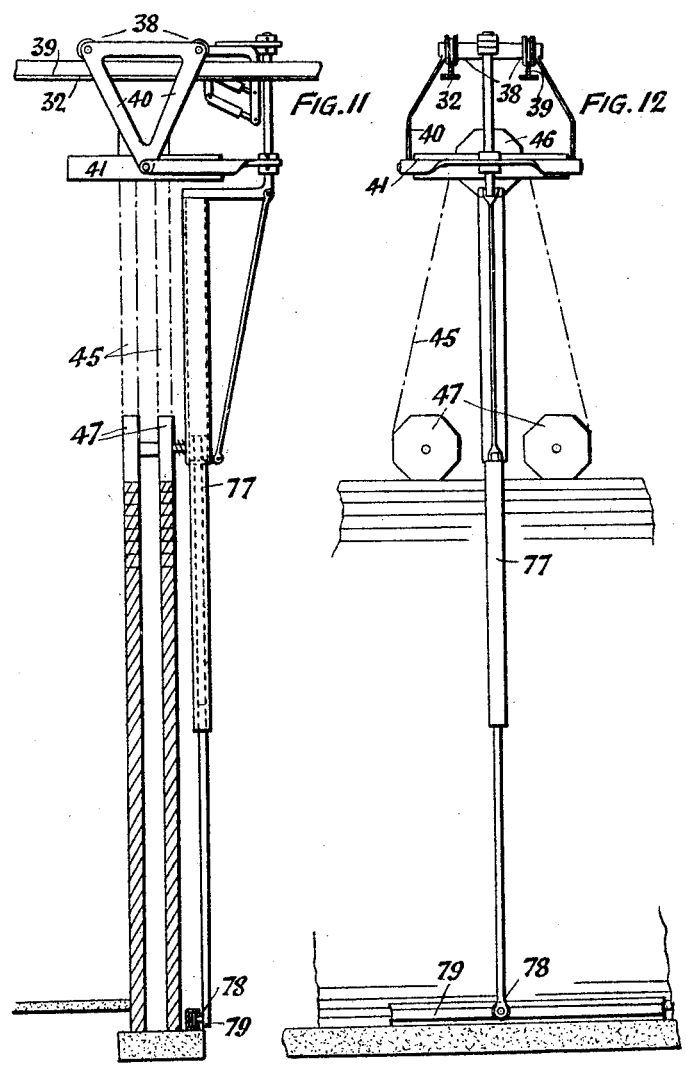

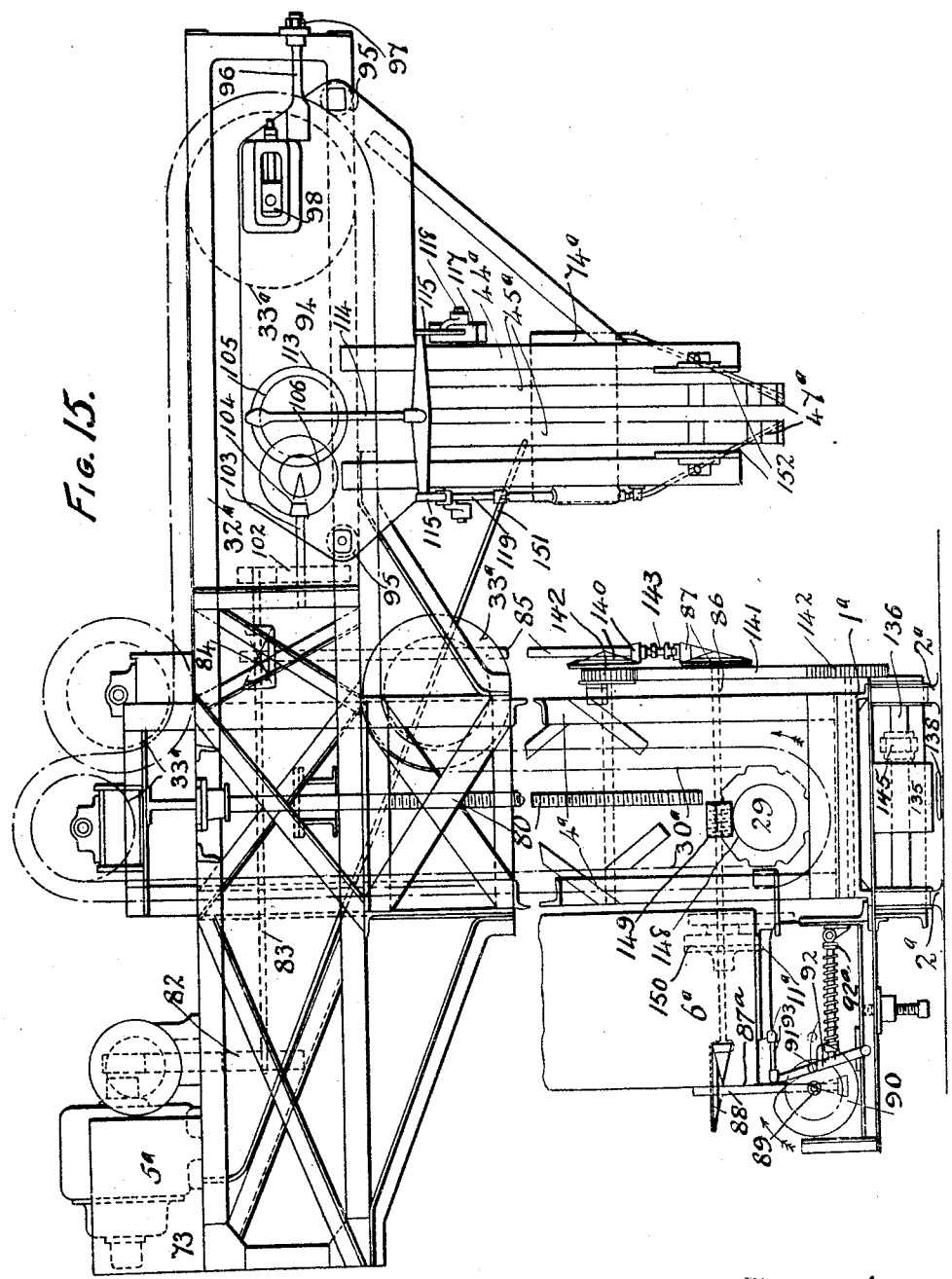

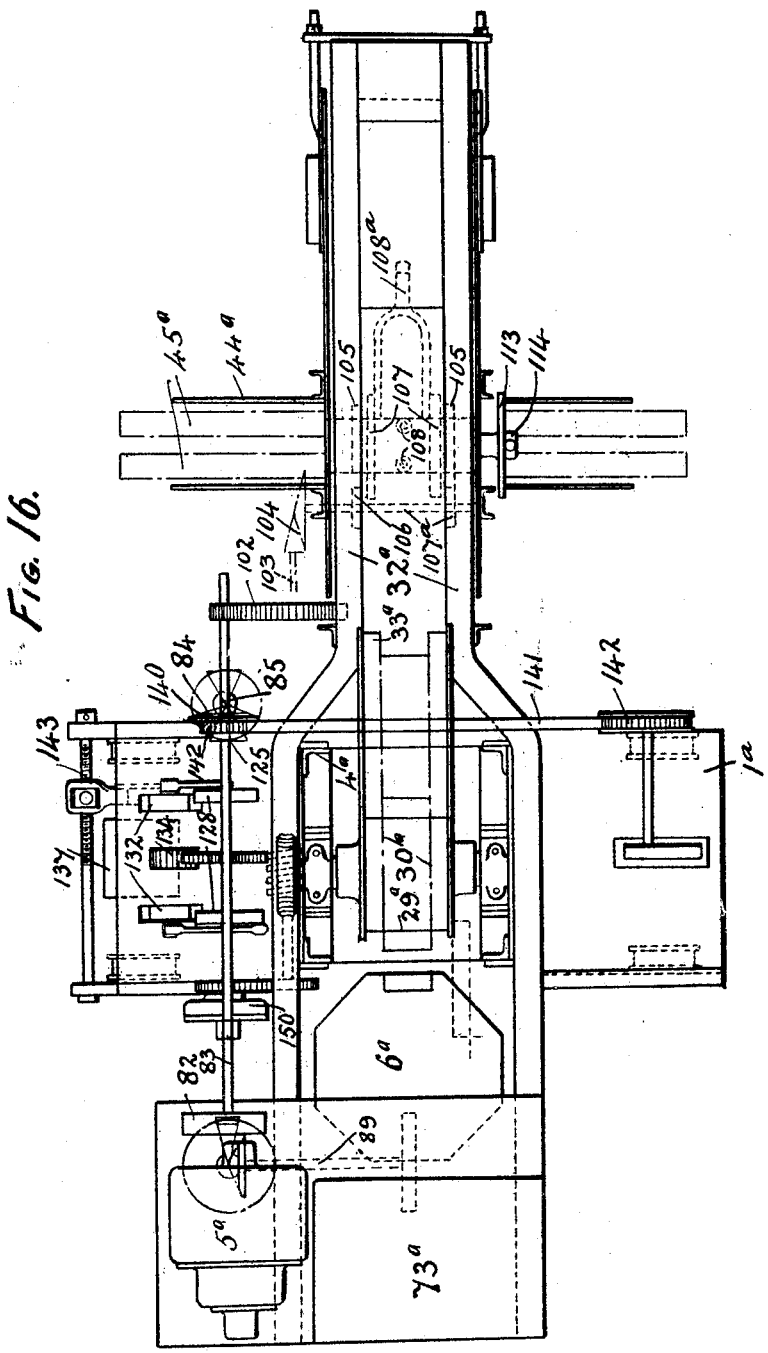

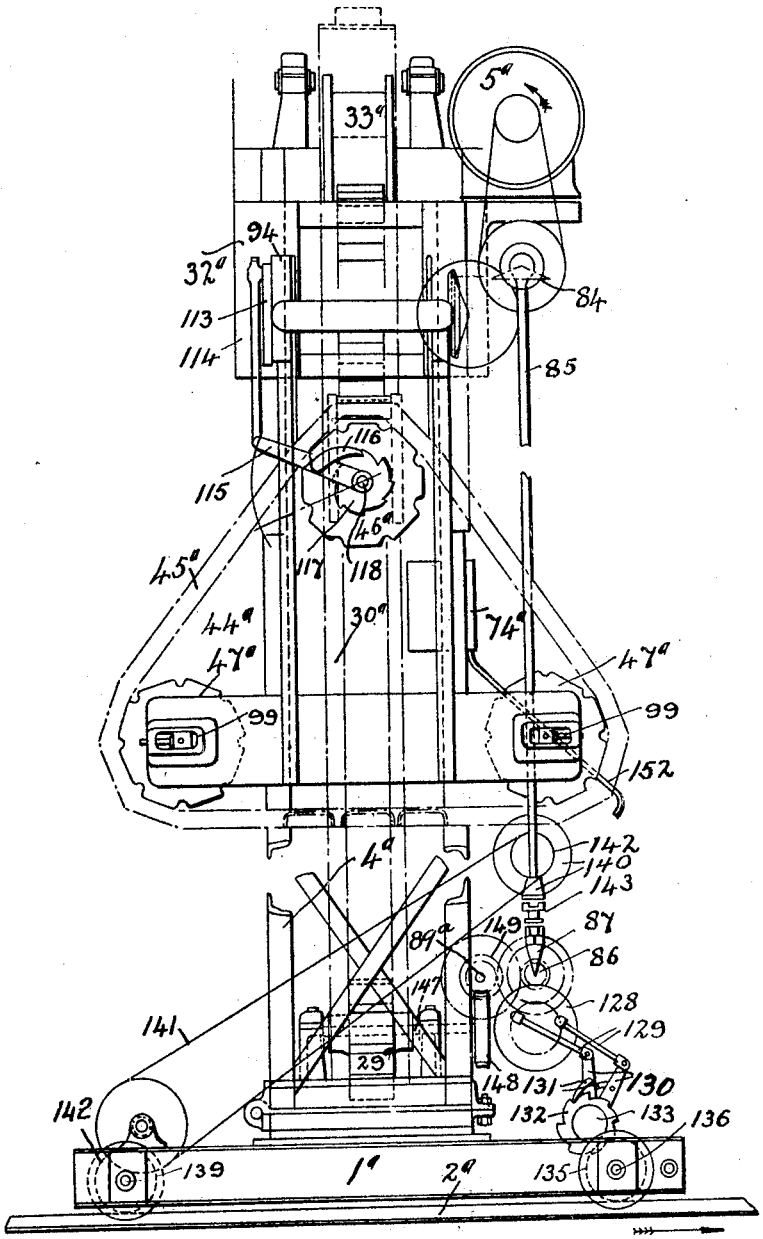

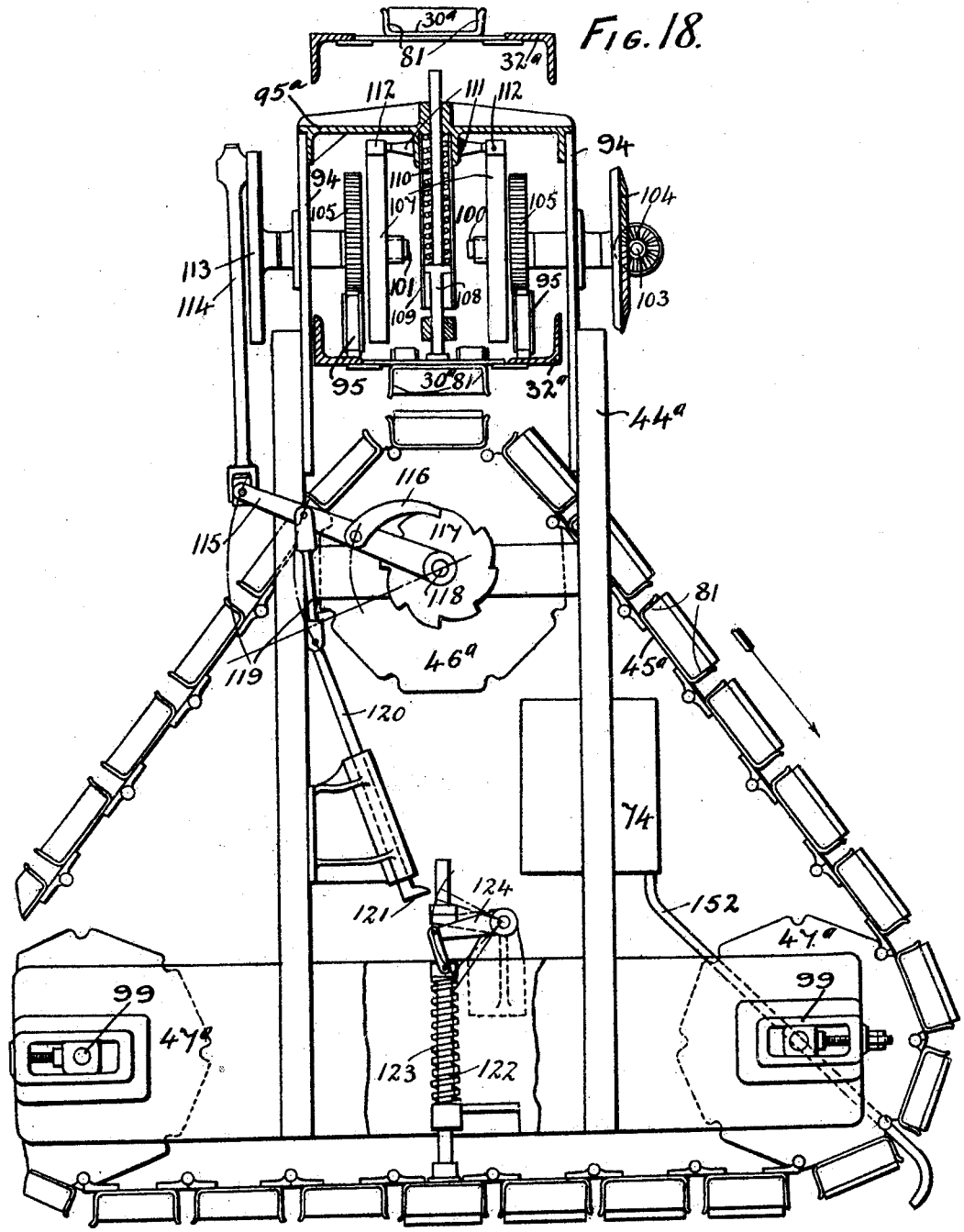

S. KAYE.
MACHINE FOR ERECTING WALLS OF BRICK AND THE LIKE.
APPLICATION FILED DEC. 14, 1918.

1,411,172.

Patented Mar. 28, 1922.
12 SHEETS—SHEET 11.

Inventor:
Stewart Kaye,
by his Attorneys

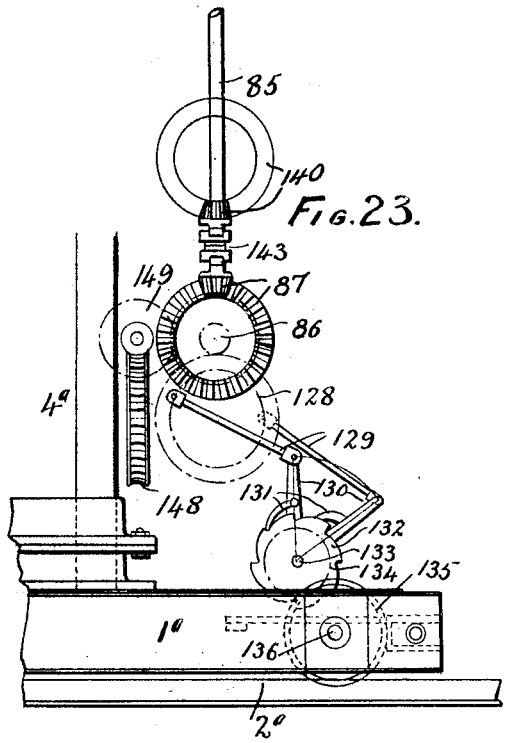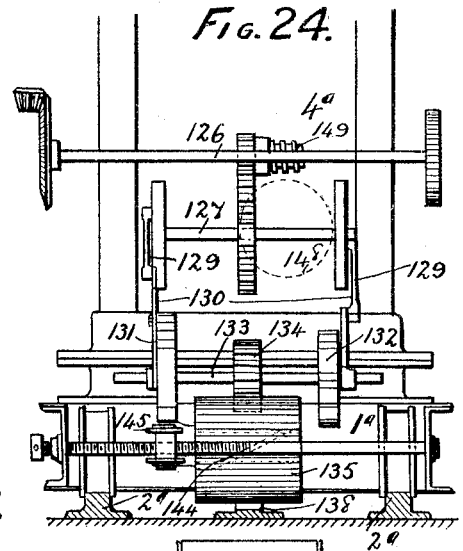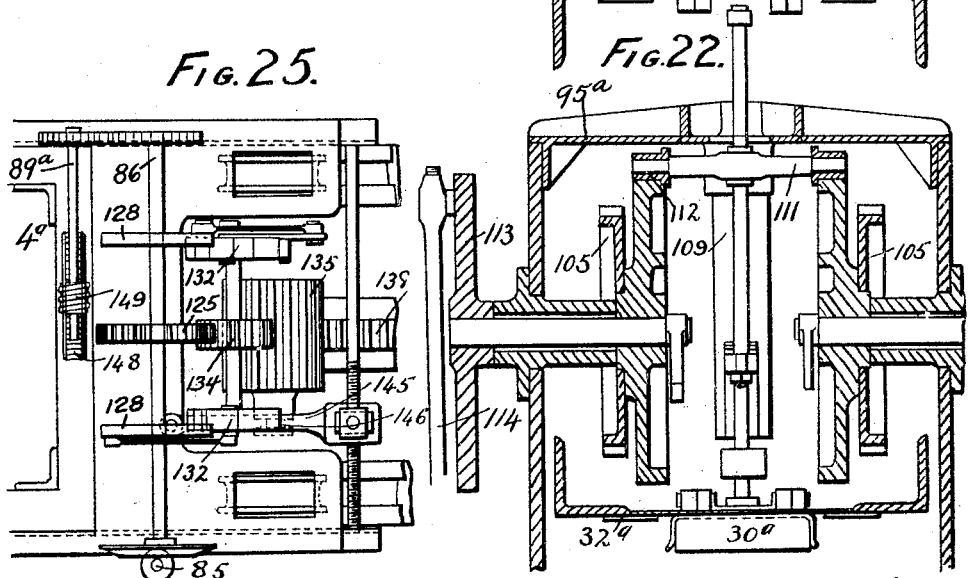

UNITED STATES PATENT OFFICE.

STEWART KAYE, OF EDINBURGH, SCOTLAND.

MACHINE FOR ERECTING WALLS OF BRICK AND THE LIKE.

1,411,172.  Specification of Letters Patent.  Patented Mar. 28, 1922.

Application filed December 14, 1918. Serial No. 266,832.

*To all whom it may concern:*

Be it known that I, STEWART KAYE, a subject of the King of Great Britain and Ireland and the Isle of Man, and a resident of Edinburgh, Scotland, captain in the Royal Engineers, have invented new and useful Machines for Erecting Walls of Brick and the like, of which the following is a specification.

This invention has reference to a machine for erecting walls of bricks and the like and comprises an upright structure having a horizontal structure the distance of which from the ground level alters as the successive courses of bricks are laid. The horizontal structure is provided with a pendant apparatus termed the "laying" mechanism which comprises a "laying" chain (or chains for double walls) of the caterpillar type of mechanism. The upright and horizontal structures are provided with conveyor chain mechanism.

The bricks are placed in a receptacle or hopper and elevated therefrom by means of a conveyor which elevates the bricks to the said horizontal structure, and then conveys them to the laying mechanism.

The whole apparatus is carried on a vehicle which also carries the brick receptacle into which the bricks to be laid are placed in tiers or columns.

The machine is so operated from a motor or the like carried by same that bricks are fed one at a time from the hopper containing same into the conveyor chain, elevated by the latter to the horizontal structure, transferred from the conveyor chain to the "laying" chain by transferring mechanism and then laid in the position to form the wall by the said laying chain. Mortar or the like is also carried by the machine in a tank and is placed on the bricks as they are laid.

There are two ways in which a building may be built and one way consists in building from the inside of the building being erected while the other way consists in building from the outside of the building being erected.

The situation of the proposed building sometimes necessitates building from the inside and sometimes the building may be built from the outside. Further in some parts of Great Britain (for instance in Scotland) it is usual to build from the inside while in other parts (for instance in England) the trade custom is to build from the outside.

The machine according to this invention is, under one modification, adapted to build from the inside, while, under another modification, is adapted to build from the outside of the proposed building.

According to the first modification the machine comprises a vehicle provided with a vertical, rotatable, telescopic, pillar or girder structure having at its upper end a horizontal arm or frame which carries a vertical and downwardly projecting frame capable of being moved along the horizontal frame. Conveyors are provided to elevate the bricks, blocks and the like to the horizontal arm or frame, then along said arm or frame, and from there to their position and mechanism is also arranged to place the mortar or the like on the bricks and to place the bricks in their position on the wall.

This machine is particularly adapted to build the four walls of a building such as a house, villa, or factory, and when the telescopic structure is collapsed the vehicle may be run into its position, the walls built, and as the walls rise the structure carrying the conveyors is extended and then the structure is collapsed again, and the vehicle may be run out through the doorway. The machine is preferably operated by means of small motors or the like.

According to the second modification the machine differentiates from the before-mentioned machine in that the vertical girder structure is not rotatable nor is it telescopic but is a fixture (while the operation of building is being performed) to the vehicle carrying same while the horizontal arm consists of a cantilever frame capable of being moved vertically up and down on said vertical girder structure. The laying mechanism carried by the cantilever frame is not capable of travelling horizontally along the said frame but is only capable of being moved slightly along same for the purpose of adjustment. The laying mechanism itself is also improved or modified in design and so also is the conveyor chain, the feeding mechanism and the carriage or vehicle travelling mechanism.

These and other improvements will be hereinafter more particularly described and referred to.

In order that others skilled in the art to which this invention relates may properly understand the same I have hereunto appended 12 sheets of explanatory drawings in which:—

Figure 1 is a diagrammatic side elevation of the lower portion of a machine as constructed according to the first modification of this invention for erecting walls of bricks and the like.

Figure 2 is a similar view of the upper portion of the machine.

These two views are divided for convenience of illustration and Figure 2 is a continuation of Figure 1; the machine being shown in the extended position.

Figure 3 is a diagrammatic end elevation of the laying mechanism.

Figure 4 is a diagrammatic plan view of Figure 2.

Figure 5 is a sectional diagrammatic plan view of the lower part of the machine as illustrated by Figure 1; the section being taken on the line 5—5 of Figure 2.

Figure 6 is a diagrammatic outline of the machine collapsed.

Figure 7:
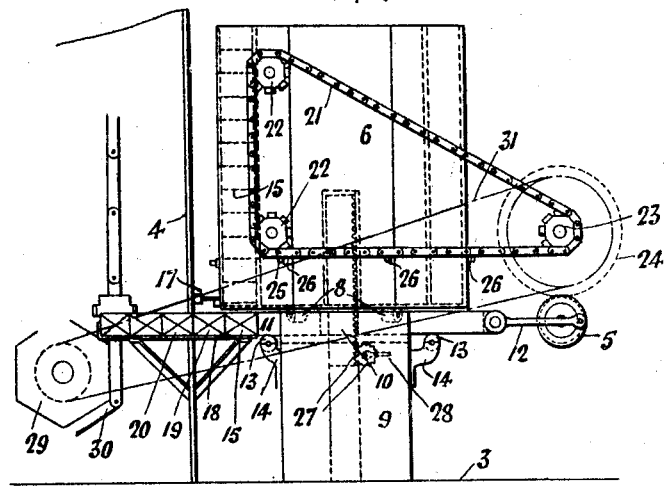

Figure 7 is an elevation of the feeding device.

Figure 8:
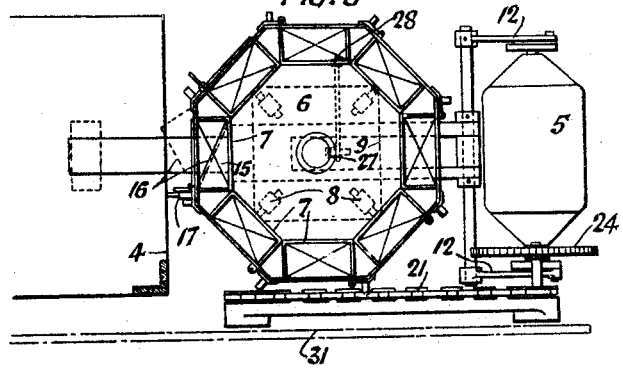

Figure 8 is a plan view of same.

Figures 9 and 10 are elevations at right angles to each other of the mechanism for transferring the bricks from the conveyor mechanism to the laying mechanism.

Figures 11 and 12 are respectively diagrammatic elevations at right angles to each other of the laying mechanism.

Figures 13, 14:
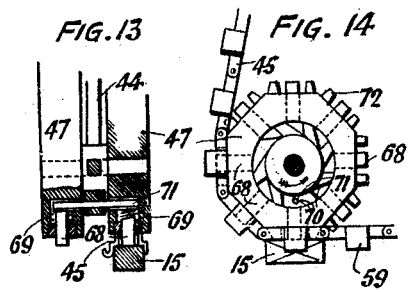

Figures 13 and 14 are respectively a sectional elevation and an elevation at right angles thereto of the lower part of the laying mechanism.

Figure 15 is a diagrammatic side elevation (shown broken away in the centre for convenience of illustration) of the machine constructed according to the second modification.

Figure 16 is a plan view of same, and

Figure 17 is an end elevation of same.

Figure 19:
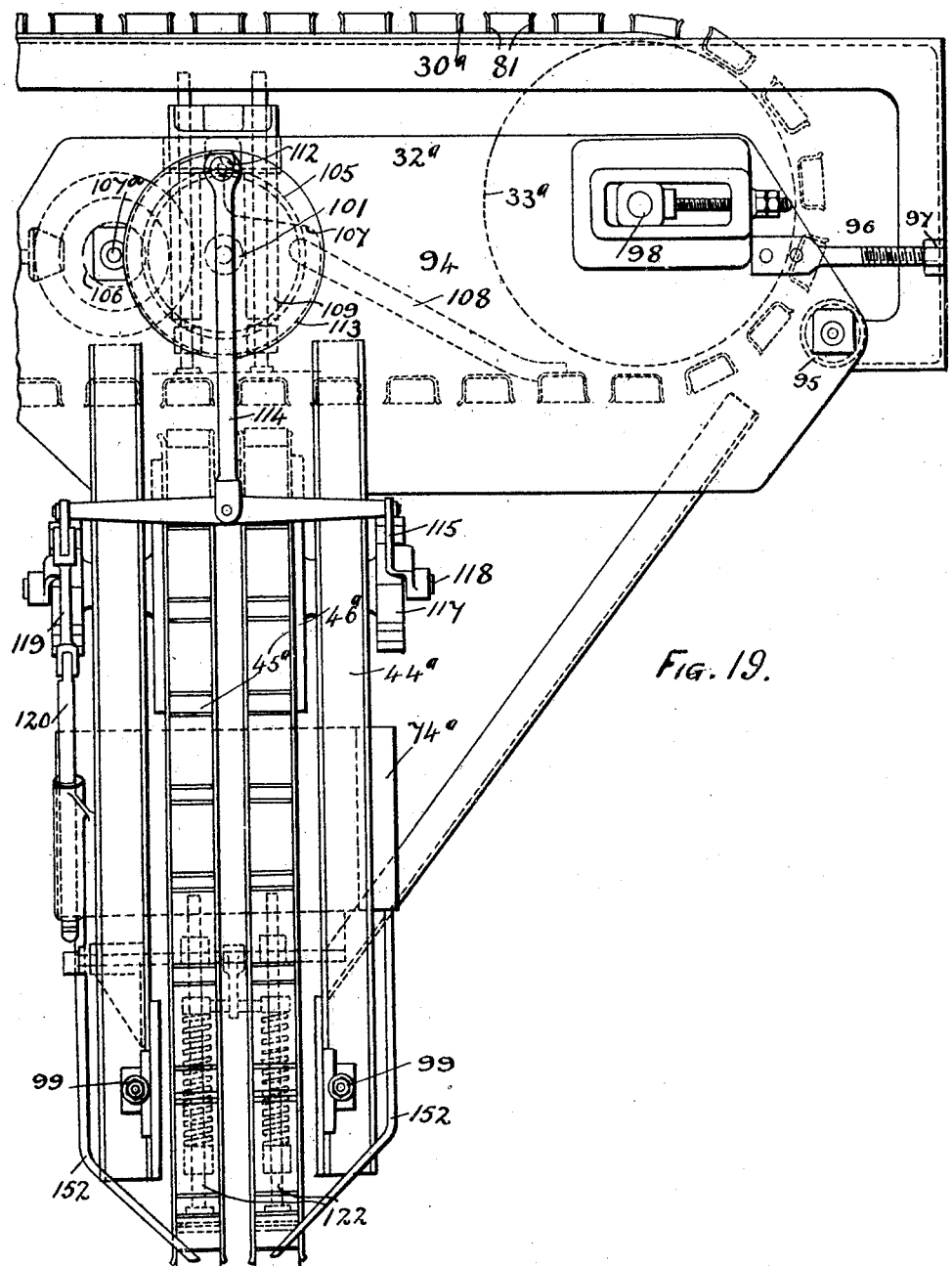

Figures 18 and 19 are respectively elevations at right angles to each other of the laying mechanism.

Figure 20:
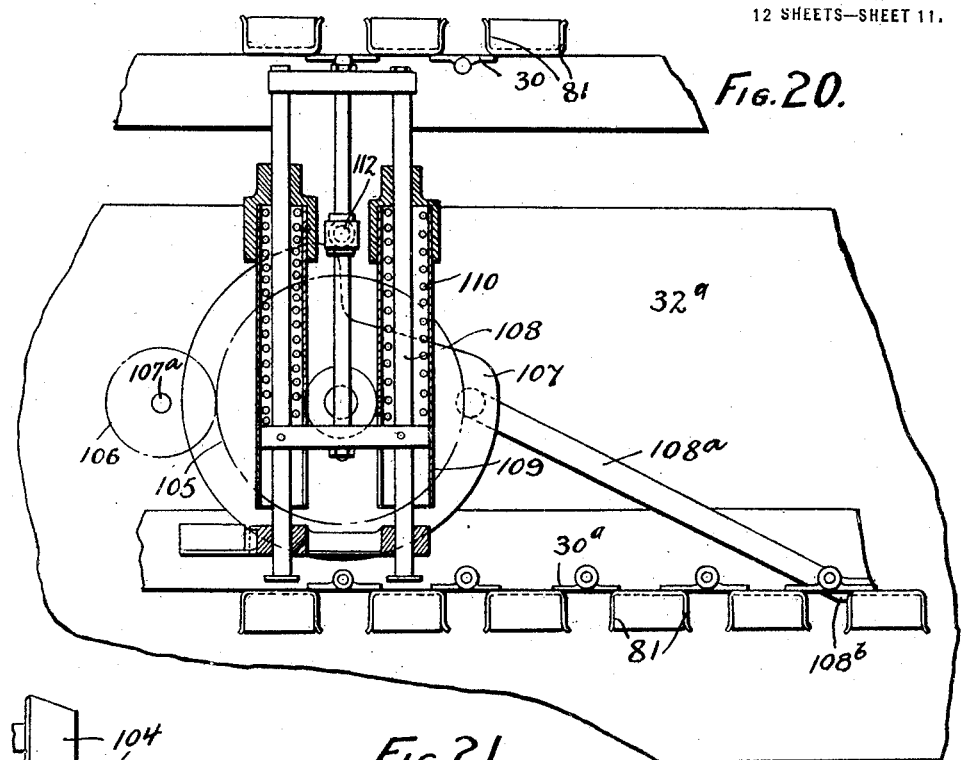

Figure 20 is a sectional elevation.

Figure 21:
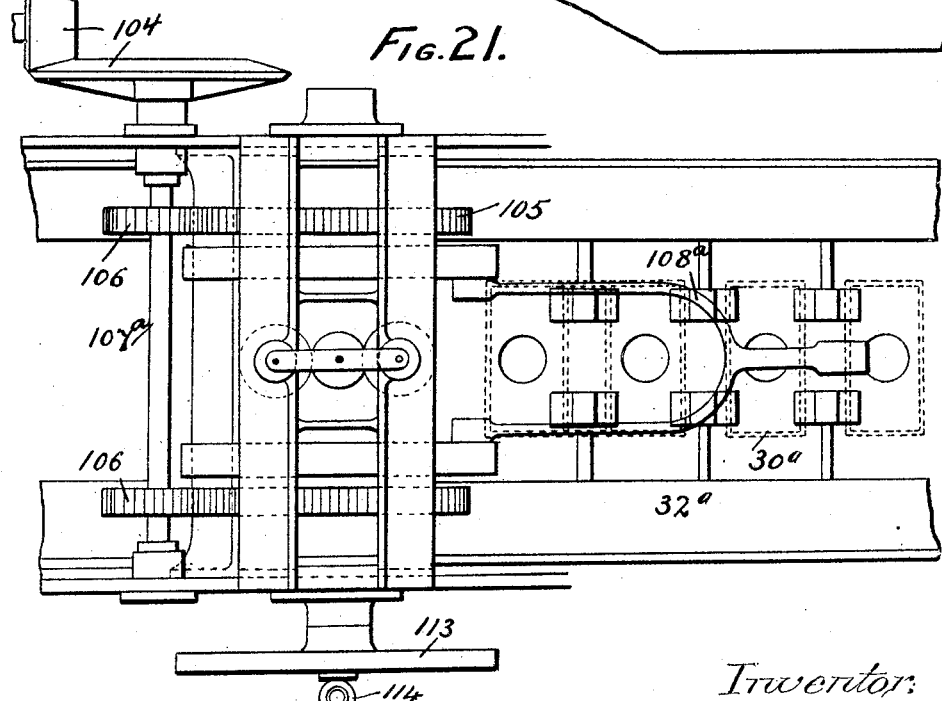

Figure 21 is a plan view and

Figure 22 is a transverse sectional elevation of the transferring mechanism.

Figures 23 and 24 are respectively elevations at right angles to each other, and Fig. 25 is a plan view of part of the vehicle illustrating particularly the mechanism for advancing the machine during the operation of building.

Referring to these drawings.

In carrying the improvements of this invention into effect or practice under the first modification a vehicle 1 adapted to run on rails 2 is provided with a turntable 3 which carries a vertical telescopic pillar or girder structure 4.

Preferably the turn-table 3 is rotated intermittently step by step, a predetermined distance and at the proper times by means of worm and worm wheel gear operated automatically from a motor 5 by means of suitably arranged contacts.

The turn-table 3 is provided with a brick feeding device consisting of a removable and rotatable container or receptacle 6, Figs. 7 and 8 having a plurality of compartments 7.

Preferably the receptacle 6 is provided with eight compartments 7, and with means whereby each of the compartments in turn register with the feed device proper. The receptacle 6 rests on rollers 8 carried in suitable bearings on the standard 9, and is mounted on a shaft 10. The feeding device proper consists of a plunger or ram 11 reciprocated from the motor 5 by the crank and link 12. This ram 11 works on rollers 13 carried by the brackets 14. The bricks 15 are stacked in each compartment 7 and are supported, when not registering with the feed device proper, by means of an angled hinged shutter plate 16. When a compartment 7 is over the ram 11 the plate 16 is swung outwards by suitable stops or catches 17 from below the bottom brick 15 of the stack and the bottom brick rests on the upper surface of the ram 11 when same is forward. When the ram 11 is drawn back, into the position shown by Figure 1 by means of the crank 12, the stack of bricks falls down so that the bottom brick rests on the table or support 18. The ram 11 now moves forward and pushes the bottom brick into position 19. The second bottom brick now becomes the bottom brick and rests on the upper surface of the ram 11. The ram is now drawn back and the stack of bricks falls down as before. The ram moving forwards again pushes the brick in position 19 to position 20 and the brick in position at the bottom of stack to position 19. It will thus be seen that all the bricks in this compartment 7 are successively fed forwards on table 18. When one compartment 7 is exhausted the receptacle 6 is rotated one eighth of a revolution so as to bring the next compartment 7 into the feeding position, and so on each compartment in turn being brought into position. The means for rotating the receptacle 6 the correct distance preferably consists of an endless chain 21 passing over sprocket wheels 22 and 23 driven from the motor 5 by the gearing 24 at the desired speed. This chain 21 is provided with a projection 25 adapted to engage the projections 26 carried by the receptacle 6. It will be readily understood that when the projection 25 meets projection 26 the receptacle is rotated a part of a revolution and when projection 25 moves away from projection 26 the receptacle is at rest and remains at rest until the projection 25 has travelled round the sprocket wheels 22 and 23 back to engage the next projection 26. When all the compartments 7 are empty the shaft 10 is moved downwards clear of the receptacle 6 by means of the rack and pinion 27 and handle 28.

The empty receptacle 6 is now removed and a full receptacle is substituted. The shaft 10 is now moved up again and the operation of feeding the bricks is repeated.

The telescopic structure 4 is provided with bottom wheels 29, Fig. 1, round which a conveyor chain 30 passes. The wheels 29 are driven from the motor 5 by the gearing 24 and chain or like device 31.

The upper end of the telescopic structure 4 is provided with a horizontal frame or arm 32, Fig. 2, and the conveyor chain 30 passes over rollers 33 and over a loose weighted roller 34 which takes up the slack of the chain 30 as the structure is collapsed.

The telescopic structure 4 preferably consists of a girder frame-work and is extended the requisite amount by means of hydraulic pumps and connection 35, Fig. 1.

The chain 30 preferably consists of a double set of links 36, Fig. 4, provided with hinged or pivoted plates 37, Fig. 3, adapted to remain always in the horizontal position, and to carry between them the bricks 15. When the chain is passing up the structure 4 the bricks on the table 18, Fig. 1, are fed on to the plates 37 and carried by these plates 37 along the horizontal frame 32 and then transferred to the laying chains and mechanism. This laying mechanism consists of a carriage provided with wheels 38, Figs. 2 and 3, adapted to run on the rail members 39 of the frame 32. The carriage consists of a triangular frame or arms, 40, which carry between them a pivoted ring (or gamblin wheel) 41 provided with a race 42 on which rollers 43 of a laying structure 44 are adapted to run and turn. It will be readily understood that as the turn-table 3 rotates through an angle 45° and carries round the horizontal frame 32 the laying structure 44 will remain in the same vertical plane. The laying mechanism also consists of two chains 45, Figs. 2 and 3, which pass over wheels 46 and 47 carried by the structure 44 and the bricks are transferred from the conveyor chain 30 to the laying chain 45 by means of spring arms 48, Figs. 9 and 10, and a drop plate 49 secured to the frame 49ª so as to be capable of rotating in a horizontal plane and having flanges 50. The spindle 51 of the rollers 46 carries a star or sprocket wheel 52 the arms of which engage the limb 53 of a lever 53, 56. The limb 56 is provided with a roller 54 adapted to bear on the plate 49. Each arm of the star wheel 52 in turn moves the limb 53 of lever into the position shown by dotted lines and consequently the plate 49 is pressed down by the roller 54. The inverted cone 55, as plate 49 is lowered forces apart the arm 48 and the bricks in positions 57 and 58 are gripped between these arms 48 and the flanges 50 of the plate 49. The plates 37 of the chain 30 pass from under the bricks while in positions 57 and 58, and these bricks are lowered on to gripping plates 59, Fig. 14, provided on the laying chains 45. The cone 60, Figs. 5, 9 and 10, releases the bricks from the gripping arms 48 and flanges 50 and the spring 61 and telescopic rods 62 brings the frame 49ª and mechanism to the upper position ready to lower the next pair of bricks. The bricks are carried down by the chains 45 and placed in position on the wall. As shown there are two chains 45, Fig. 2, which erect a double wall.

When the horizontal frame 32 is inclined at an angle other than a right angle, to the laying chains (or to the wall being built) it is necessary that as the bricks are transferred from the chain 30 to the chains 45 that they are turned into the proper position for placing on the chains 45.

This mechanism consists in fitting to the distance piece 53, Figs. 9 and 10, between the wheels 46 a spindle or rod 64 provided with a spiral web 65.

When the chains 45 are at right angles to the conveyor chains 30 a collar 66, provided with a V or like shaped groove, and carried by an arm or bracket 67, does not engage with the spiral web 65 so that the transferring mechanism has a direct drop and return. Assume, however, that the chains 45 and consequently also the spindle 51, star wheel 52 and levers 53 and 56 are at an angle other than a right angle to the conveyor chain 30 and the drop plate is drawn down as stated. On such downward movement the groove in the collar 66 carried by the arm 67 attached to said drop plate, comes in contact with the spiral web 65 on the rod 64 which web turns the drop plate about its support to the required extent before the bricks carried thereby come over the chain 45.

At the lower part of the laying mechanism the chains 45 pass over wheels 47, Figs. 3, 12 and 13, and place the bricks on the wall.

These wheels 47, Figs. 13 and 14, are provided with plungers 68 having springs 69 and having tapered or angled ends 70 which are acted upon to press the brick into position by a pin or the like 71. This pin 71 is a fixture in the frame 44 and acts on the tapered ends 70 as they pass below same.

The projections 72 on the wheels 47 form the teeth for engaging the chains 45.

The mortar for binding the bricks is preferably carried in a tank 73, Figs. 4 and 6, arranged at the end of the horizontal frame 32 and is conducted to a small auxiliary tank or receptacle 74, Fig. 3, carried by the laying structure 44 by means of flexible pipes, not shown. The tank 74 may be provided with an agitator or the like.

The mortar is led from the tank 74 to the upper surface of the course of bricks already laid by means of a pipe 75 so that just before the bricks are laid on that course a layer of mortar is placed below same.

Another pipe 76 conducts the mortar from the tank 74 to the spaces between the bricks so that just before the bricks are laid in position a layer of mortar is inserted between their ends.

The laying mechanism is provided with telescopic guide rods 77, Figs. 11 and 12, having a roller 78 at its lower end adapted to run in a guide rail 79 arranged along the wall being built.

After one course of bricks has been laid the telescopic structure is extended the desired amount by means of suitably arranged contacts which operate the hydraulic mechanism 35, Fig. 1, or other suitable hoisting gear.

The rails 2 upon which the vehicle 1 runs are laid end to end of the building to be built centrally parallel with the side walls. In operation the vehicle 1 commences near the end of the one side wall with the horizontal arm 32 at right angles to the rails 2 and side wall. As each brick is laid the vehicle 1 moves forward the vehicle travelling along the rails parallel with the side walls. When the vehicle has reached the limit of its travel there is a small portion of the wall to be done up to the corner and this is effected by rotating the horizontal arm 32, the laying mechanism remaining parallel with the rails 2 and the bricks while being transferred from the chain 30 to the chains 45 being turned.

The movable carriage or member of the horizontal frame 32 moves outwards along the said frame a sufficient distance while the frame 32 is rotating. When the one course on the one side wall is completely laid the horizontal arm 32 still rotates and the course is laid on the end wall and similarly on the first portion of the outer side wall up to the point where the horizontal arm is at right angles to the rails 2. The vehicle 1 then travels back and then the frame 32 rotates until the course on the other end wall is laid and then the course on the first side wall is completed.

The vehicle is now in the position it first started from and the one course is laid. The telescopic structure 4 is extended the desired height (the thickness of brick and mortar) and the next course is laid in a similar manner.

The vertical guide arm and laying structure may be fitted to build walls of varying thickness, such as 4½″, 9″, 14″, or 18″ thick, at one and the same time by an adjustment for laying on two or more bricks at the same operation. To accomplish this I may provide the laying structure with one or more laying chains 45 and by modification of the drop plate 49 arrange the latter to grip the required number of bricks according to the thickness of the wall to be built.

For intermediate or internal walls in a building the vehicle may be smaller and mounted on two wheels to run on one rail instead of on four wheels to run on two rails.

To form lintels for the doors and windows wire mesh work of the breadth of the wall may be simply run round the course and the next course laid on same.

Instead of an endless chain carrier being used to carry the bricks up the telescopic structure any other suitable form of elevator or carrier may be used.

In carrying the improvements of this invention into effect or practice under the second modification the vehicle 1, Figs. 15 and 17, having preferably four wheels adapted to run on two parallel rails $2^a$ is provided with a vertical girder structure $4^a$ which when the operation of building is being performed is a fixture to the vehicle 1 but for convenience in transporting the machine may swing downwards on hinges or pivots by loosening securing bolts or the like.

This structure $4^a$ is greater in height than the wall which is to be built by the machine. A cantilever frame $32^a$ is fitted to this vertical structure $4^a$ and is capable of being moved up or down thereon by means of screwed shafts 80 carried by the vertical structure and working through internally screwed nuts or bosses carried by the cantilever frame $32^a$.

The endless conveyor chain $30^a$ passes round a drum $29^a$ preferably of polygonal shape in cross section, mounted at the lower end of the vertical structure $4^a$ and round pulleys or drums $33^a$ mounted on the cantilever frame $32^a$ at the junction of same and the vertical structure $4^a$ and also at the extremity of the cantilever frame $32^a$. This conveyor chain $30^a$ preferably consists of a plurality of links each of which is provided with preferably two spring plates 81, Figs. 18, 19 and 20, between which the bricks are clipped or gripped at their sides.

The bricks are carried in a box like reservoir $6^a$, Fig. 15, provided on the vehicle $1^a$ and are fed into the conveyor $30^a$ one at a time by ram or plunger mechanism $11^a$, Fig. 17. This feeding mechanism is actuated from the motor $5^a$ or the like arranged on the shorter of the two overhanging ends of the cantilever frame 32ª and which by means of spur or like gearing 82, Figs. 15 and 16, drives a horizontal shaft 83 carried by the cantilever frame 32ª. This horizontal shaft 83 drives by means of bevel or like gearing 84 a vertical and telescopic shaft 85 which is carried by the vertical structure 4 and which drives a horizontal shaft 86 by means of bevel or like gearing 87. This latter horizontal shaft 86 drives by means of a vertical shaft 87ª and bevel gearing 88 another horizontal shaft 89 at a lower level on which is mounted a cam 90, Fig. 15, which by means of a roller 91 bearing against its cam surface and carried by a spring controlled lever 92 reciprocates the ram or plunger 11ª connected to the lever 92 by means of a link 93. Lever 92 is pivoted at its lower end and as it swings about its pivot under the action of the cam 90 it forces forward the plunger 11ª to which it is connected as aforesaid, the return movement of the lever 92 and therefore the plunger 11ª being effected by the compressed spring 92ª. This ram 11ª is adapted to force the bricks one at a time out of the box like reservoir 6ª into the conveyor 30ª. This mechanism is so timed by the arrangement of the gearing that at the instant one of the links of the conveyor 30ª is opposite the ram 11ª the brick is forced into the spring clip 81. The bricks are carried by the conveyor 30ª from the feeding mechanism up the vertical structure 4ª and along the cantilever frame 32ª to the laying mechanism suspended from said cantilever frame. This laying mechanism consists of two side cheeks 94, Figs. 18 and 19, provided with rollers 95 adapted to rest on the girder rails of the cantilever frame 32ª. The two side cheeks 94 are connected by a bridge piece and are provided with a screwed rod 96 having nuts 97 so that the position of same can be adjusted on the cantilever frame 32ª. The return pulley or drum 33ª for the conveyor chain 30ª is also mounted between these side cheeks 94 on adjustable bearings 98 so that its position can be adjusted also. A downwardly hanging frame 44ª is supported from these side cheeks 94 and is provided with preferably three rollers or drums 46ª and 47ª round which a laying chain 45ª passes. These rollers 46ª and 47ª are arranged one 46ª near the upper part of the hanging frame 44ª and just below the cantilever frame 32ª and the other two 47ª at a lower level and one on each side of the hanging frame 44ª. The two lower rollers 47ª are provided with adjustable bearings 99. In order that double walls may be built there are two laying chains 45 arranged side by side and passing round the three rollers 46ª and 47ª. Mechanism is arranged to transfer the bricks from the conveyor 30ª to the laying chains 45ª, Figs. 18 and 19. This mechanism consists of two horizontal transverse spindles 100 and 101 arranged in alignment between the side cheeks 94, one passing through each cheek with a space between the inner or adjacent ends of the spindles 100. A transverse spindle 107ª, Figs. 16, 19 and 21, extending between the cheeks 94, is rotated by means of bevel gearing 104, spur wheels 102 and the shaft 83 which is driven from the motor 5ª. Pinions 106 mounted on the spindle 107ª drive wheels 105 secured to the spindles 100 and 101.

On each of the spindles 100 and 101 a cam 107 is mounted. These two cams 107 are provided with a reciprocating "pusher" rod 108ª pivoted to said cams and which as the cams 107 rotate engages with the conveyor chain 30ª by means of a projection 108ᵇ, Fig. 20, and pushes same along the distance of two links. Between the cams 107 two vertically reciprocating rods 108 are mounted each within a sleeve or tube 109 which also contains a spring 110 adapted to press the rod 108 downwards. The rods 108 are held up against the action of the springs 110 by arms 111 provided with rollers 112 engaging the cams 107. As the cams 107 rotate the cam surfaces permit the rods 108 to move downwards, to pass through openings in the links of the conveyor chain 30ª and to eject the bricks on to the laying chains 45ª. The laying chains 45ª are travelled from the aforesaid short horizontal spindle 101, see Fig. 18 by means of a crank disc 113, Fig. 18, mounted on the spindle 101 and having a connecting rod 114 which is also connected to the end of a lever 115 provided with a pawl 116 adapted to engage the teeth of a ratchet wheel 117 mounted on the spindle 118 of the roller 46ª of the laying chains 45ª. This mechanism is so arranged that one of the links of each laying chain 45ª exactly registers with the links of the conveyor chain 30ª so as to receive the bricks ejected therefrom. The lever 115 carrying the pawl 116 of the upper roller spindle 118 is connected by a link 119 to a downwardly reciprocating rod 120 having a "foot" 121 at its lower end. This "foot" 121 is adapted to actuate vertical rods 122 controlled by springs 123 by means of bellcrank lever and rod mechanism 124. These rods 122 eject the bricks from the laying chains 45ª on to the wall being built. To enable the bricks to be laid in rotation to form each "course" the whole machine carried by the vehicle 1ª moves along the rails 2ª. This "travelling" movement is almost continuous but not quite. There is a very short period of rest to enable the bricks to be laid. This motion is accomplished from the shaft 86 driven from the before mentioned telescopic shaft 85, see Figs. 23, 24 and 25 carried by the vertical girder structure 4ª. Said shaft 86 by means of spur wheels 125, Figs. 24 and 25, drives a shaft 127 provided with two crank discs 128 each of which is connected by means of a link 129 with the end of a lever 130 provided with a pawl 131 adapted to rotate intermittently a ratchet wheel 132 mounted on a spindle 133. These two ratchet wheels 132 rotate the spindle 133 with the period of rest as desired. This spindle 133 is provided with a spur wheel 134 which engages with a similar wheel 135 on the travelling wheel axle 136 of the vehicle 1ª carrying the machine. Preferably this wheel 135 is adapted to engage a rack 138 laid between the parallel rails 2. When it is desired to travel the vehicle 1ª along the rails 2ª without this intermittent motion but steadily the other travelling wheel axle 139 is rotated by means of bevel gearing 140, chain 141 and sprocket wheels 142, Figs. 15, 16 and 17, actuated from the vertical telescopic shaft 85. A clutch 143 is arranged so that either the one travelling mechanism or the other is in gear. Preferably the pinion 135 on the vehicle axle 136 is comparatively long and slides on a helical key 144, Fig. 24, on the axle 136 so that the machine may be brought into pitch with the bricks on alternate layers or courses and may be adjusted slightly if desired as the laying proceeds. This may be accomplished by means of a lever 145 and clutch 146 provided on the pinion 135 which engages the rack 138 between the rails 2.

To ensure that the links of the conveyor chain 30ª will be in proper position to receive the bricks from the feeding mechanism the spindle 147, Fig. 17, of the lower conveyor chain roller 29 is provided with a worm wheel 148 which engages with a worm 149 mounted on the spindle 89ª driven from the spindle 86 of the feed driving mechanism which spindle 86 is also provided with a coupling 150, Fig. 16, which consists of two discs connected together by a T headed bolt passing through one disc and engaging a slot formed in the other disc.

Beside the motor 5ª on the cantilever frame 32ª a mortar tank 73ª, Fig. 18, is arranged and on the downwardly hanging laying frame 44ª a secondary tank 74ª is arranged. The secondary tank 74ª is supplied from the first tank by means of a pipe 151 and delivers the mortar on to the top of the bricks being laid by means of another pipe or pipes 152.

When one course of bricks has been laid the cantilever frame 32ª is raised the necessary distance (one brick and the mortar joint) by means of the rotation of the vertical screwed shafts 80.

What I claim and desire to secure by Letters Patent is:

1. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, mechanism carried by the horizontal frame for transferring the bricks and the like from a conveyor mechanism vertically to the wall being built, and apparatus for applying mortar to said wall.

2. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism carried by the horizontal frame for transferring the bricks and the like vertically to the wall being built, apparatus carried by said horizontal frame for applying mortar to said wall, and mechanism for transferring the bricks and the like from the said conveyor mechanism to the said laying mechanism.

3. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism carried by the horizontal frame for transferring the bricks and the like vertically to the wall being built, apparatus carried by the horizontal frame for applying mortar to said wall, a brick receptacle carried by said vehicle, means adapted to feed the bricks from said receptacle to said conveyor mechanism, and means for transferring the bricks and the like from the said conveyor mechanism to said laying mechanism.

4. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism suspended from said horizontal frame for transferring the bricks and the like vertically to the wall being built, apparatus carried by the horizontal frame for applying mortar to said wall, a brick receptacle carried by said vehicle, means comprising a reciprocating rod actuated by gearing so as to register at the proper instant with the conveyor mechanism, and means for transferring the bricks from the said conveyor mechanism to said laying structure.

5. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism carried by said horizontal frame for transferring the bricks and the like vertically to the wall being built, said laying mechanism consisting of endless chains adapted to act like caterpillar mechanism to lay the bricks, apparatus carried by the horizontal frame for applying mortar to the wall, and mechanism for transferring the bricks and the like from the said conveyor mechanism to the said laying mechanism, substantially as herein set forth.

6. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, said conveyor mechanism comprising an endless chain provided with spring plates to grip the bricks, laying mechanism carried by said horizontal frame for transferring the bricks and the like vertically to the wall being built, apparatus carried by the horizontal frame for applying mortar to the wall, and mechanism for transferring the bricks and the like from the said conveyor mechanism to the said laying mechanism, substantially as herein set forth.

7. A machine for erecting walls of brick and the like comprising a vehicle adapted to travel backwards and forwards parallel to said walls, a vertical telescopic structure on said vehicle, a horizontal arm or frame on said structure, conveyor mechanism for conveying bricks and the like up said vertical structure and for conveying them along said horizontal frame, laying mechanism carried by said horizontal frame for transferring the bricks and the like vertically to the wall being built, apparatus carried by the horizontal frame for applying mortar to the wall, and mechanism for transferring the bricks and the like from the said conveyor mechanism to the said laying mechanism, substantially as herein set forth.

8. A machine for erecting walls of brick and the like comprising a vehicle adapted to travel backwards and forwards parallel to said walls, a vertical structure on said vehicle, a horizontal arm or frame vertically movable on said structure, conveyor mechanism for conveying bricks and the like up said vertical structure and for conveying them along said horizontal frame, laying mechanism carried by said horizontal frame for transferring the bricks and the like vertically to the wall being built, apparatus carried by the horizontal frame for applying mortar to the wall, and mechanism for transferring the bricks and the like from the said conveyor mechanism to the said laying mechanism, substantially as herein set forth.

9. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism carried by said horizontal frame for transferring the bricks and the like vertically to the wall being built, a removable and rotatable brick receptacle carried by said vehicle, means adapted to feed the bricks from said receptacle to said conveyor mechanism, apparatus carried by the horizontal frame for applying mortar to the wall, and means for transferring the bricks and the like from the said conveyor mechanism to said laying mechanism, substantially as herein set forth.

10. A machine for erecting walls of brick and the like comprising a vehicle, mechanism comprising pawl and ratchet wheels adapted to travel said vehicle with a period of rest, a vertical structure on said vehicle, a horizontal arm or frame on said structure, conveyor mechanism for conveying bricks and the like up said vertical structure and for conveying them along said horizontal frame, laying mechanism carried by said horizontal frame for transferring the bricks and the like vertically to the wall being built, apparatus carried by the horizontal frame for applying mortar to the wall, and mechanism for transferring the bricks and the like from the said conveyor mechanism to the said laying mechanism, substantially as herein set forth.

11. A machine for erecting walls of brick and the like comprising a vehicle adapted to travel backwards and forwards parallel to said walls, a vertical structure on said vehicle, a horizontal arm or frame on said structure, conveyor mechanism for conveying bricks and the like up said vertical structure and for conveying them along said horizontal frame, laying mechanism suspended from said horizontal frame for transferring the bricks and the like vertically to the wall being built, apparatus carried by the horizontal frame for applying mortar to the wall, and mechanism comprising spring and cam controlled rods adapted to force the bricks from the conveyor to the laying mechanism, substantially as herein set forth.

12. A machine for erecting walls of brick and the like comprising a vehicle adapted to travel backwards and forwards parallel to said walls, a vertical structure carried by a turntable on said vehicle, a horizontal arm or frame on said structure, conveyor mechanism for conveying bricks and the like up said vertical structure and for conveying them along said horizontal frame, laying mechanism carried by said horizontal frame for transferring the bricks and the like vertically to the wall being built, said laying mechanism being capable of rotating in a horizontal plane, apparatus carried by the horizontal frame for applying mortar to the wall, mechanism for transferring the bricks and the like from the conveyor mechanism to the said laying mechanism, and means to rotate the bricks and the like in a horizontal plane when being transferred from the conveyor mechanism to the laying mechanism if the laying mechanism should not lie at right angles to the said horizontal frame, substantially as herein set forth.

In testimony whereof, I have signed my name to this specification, in the presence of two subscribing witnesses.

STEWART KAYE.

Witnesses:
 PETER ROBERTSON,
 WALTER RANKIN.